United States Patent [19]

Saidi

[11] Patent Number: 5,482,697
[45] Date of Patent: Jan. 9, 1996

[54] METHOD OF MAKING $V_6O_{13+x}$ [$0<X\leq 2.0$]

[75] Inventor: M. Yazid Saidi, San Jose, Calif.

[73] Assignee: Valence Technology, Inc., Henderson, Nev.

[21] Appl. No.: 184,089

[22] Filed: Jan. 19, 1994

[51] Int. Cl.⁶ .................................................. C01B 13/32
[52] U.S. Cl. .......................... 423/592; 429/191; 429/192; 429/218
[58] Field of Search ............................ 423/592; 429/191, 429/192, 218

[56] References Cited

U.S. PATENT DOCUMENTS

| | | | |
|---|---|---|---|
| 2,784,075 | 3/1957 | Bauerle et al. | 423/592 |
| 3,087,786 | 4/1963 | Schoder | 423/592 |
| 3,483,110 | 12/1969 | Rozgonyi | 423/592 |
| 3,728,442 | 4/1973 | Pakhomov et al. | 423/592 |
| 4,039,582 | 8/1977 | Nasyrov et al. | 423/592 |
| 4,075,397 | 2/1978 | Francis et al. | |
| 4,119,707 | 10/1978 | Thome et al. | 423/592 |
| 4,228,226 | 10/1980 | Christian et al. | |
| 4,952,467 | 8/1990 | Buchel et al. | |
| 5,258,245 | 11/1993 | Takata et al. | 423/592 |
| 5,308,714 | 5/1994 | Crespi | 429/218 |
| 5,358,801 | 10/1994 | Brodd | 429/218 |
| 5,366,830 | 11/1994 | Koksbang | 429/192 |

OTHER PUBLICATIONS

D. W. Murphy et al., "Vanadium Oxide Cathode Materials for Secondary Lithium Cells" J. Electrochemical Soc., vol. 128 (1979) p. 497.

D. W. Murphy et al., "Lithium Incorporation by $V_6O_{13}$ and Related Vanadium (+4, +5) Oxide Cathode Materials" J. Electrochemical Soc., vol. 128 (1981) p. 2053.

K. M. Abraham et al., "Rechargeable Lithium/Vanadium Oxide Cells Utilizing 2Me—THF/LiAsF$_6$", J. Electrochemical Soc., vol. 128 (1981) p. 2493.

K. A. Wilhelmi et al., "A Refinement of the Crystal Structure of $V_6O_{13}$", Acta Chemica Scandinavica, vol. 25 (1971) p. 2675.

K. West et al., "$V_6O_{13}$ as Cathode Material for Lithium Cells", J. Power Sources, vol. 14 (1985) p. 235.

Primary Examiner—Wayne Langel
Attorney, Agent, or Firm—Robert Krebs

[57] ABSTRACT

A method of making non-stoichiometric vanadium oxides $V_6O_{13+x}$ by treatment with $H_2O_2$.

8 Claims, No Drawings

METHOD OF MAKING $V_6O_{13+x}$ [ $0 < X \leq 2.0$ ]

FIELD OF THE INVENTION

The present invention provides a method of synthesizing non-stoichiometric solid vanadium oxide $V_6O_{13+x}$ [$0<X \leq 2.0$]. Vanadium oxides are often cathode active materials for use in solid secondary electrochemical cells.

BACKGROUND OF THE INVENTION

Solid state lithium electrochemical cells are known in the art and typically consist of a lithium or lithium-based metal anode, a lithium-ion conducting solid electrolyte, and a cathode containing a lithium ion insertion electrode material. An insertion electrode material is capable as acting as a cathode by virtue of its ability to reversibly accommodate lithium ions physically inserted into its structure during discharge of the cell and subsequently removed therefrom during charging of the cell. Such insertion electrode materials (or intercalation compounds) include $V_2O_5$, $TiS_2$, $V_6O_{13}$, $LiCoO_2$ which have satisfactory specific energy densities of about 300–900 Wh kg$^{-1}$ and mid-discharge voltages of about 2–3 volts.

Like other elements in the transition metal group including niobium and tantalum, vanadium forms numerous and frequently complicated compounds because of its variable valence. The four principle oxidation states of vanadium are 2+, 3+, 4+ and 5+, and it forms derivatives from more or less well defined radicals such as $VO^{2+}$ and $VO^{3+}$. However, the vanadium oxide solids possess nominal stoichiometries which indicate a mixture of vanadium oxidation states is present in certain solid phases of vanadium.

Solid lithium electrochemical cells using $V_6O_{13}$ as the active cathode material are well studied. K. West et al., J. Power Sources, 14 (1985) 235–246, studied $V_6O_{13}$ as a cathode material for lithium cells using polymeric electrolytes. They found that the lithium insertion reaction was reversible in the composition interval $Li_xV_6O_{13}$ [$0 \leq x \leq 8$]. The high stoichiometric energy density for the ultimate composition $Li_8V_6O_{13}$, 890 W h/kg, is very favorable for battery applications. P. A. Christian et al., U.S. Pat. No. 4,228,226 suggest that lithiated vanadium oxides of the composition $Li_xVO_{2+y}$[$0<y \leq 0.4$] may be prepared chemically by treatment of $VO_{2+y}$ with n-butyllithium in hexane. Christian et al. report that the unit cell parameters derived from X-ray powder diffraction data suggests that the compositions $Li_xV_6O_{13}$ have a structure very similar to that of the monoclinic $V_6O_{13}$ i.e. $VO_{2+y}$[$0.1<y \leq 0.2$], prepared at higher temperature. The use of $Li_xVO_{2+y}$, chemically manufactured as aforesaid, as the positive electrode material in a cell, permits the manufacture of cells in the discharged state.

It has been reported in U.S. Pat. No. 4,228,226, the disclosure of which is incorporated herein by reference in its entirety, that vanadium oxides with nominal compositions close to $V_6O_{13}$ i.e. oxides with the nominal stoichiometry range from $VO_{2.05}$ to $VO_{2.2}$ are readily prepared by the thermal decomposition of ammonium vanadate, $NH_4VO_3$, at a controlled rate in an inert atmosphere such as argon or nitrogen, at a temperature of approximately 450° C. Furthermore, the heat treatment of $V_6O_{13}$ prepared in this manner can alter the lithium capacity of the material when used as a cathode active material in solid secondary lithium cells. It has also been observed that the morphology of vanadium oxide solids can affect the lithium capacity of the material under the same circumstances.

D. W. Murphy et al., J. Electrochemical Soc. 128 (1981) 2053, report the synthesis of $V_6O_{13}$ and $V_6O_{13+x}$ [$0<X \leq 0.5$]. Stoichiometric amounts of $V_2O_5$ and vanadium metal powder were intimately mixed and heated to 600° C. in an evacuated quartz tube. The vanadium-oxygen stoichiometry was verified by TGA in an oxygen atmosphere. $V_6O_{13+x}$ [$0<X \leq 0.5$] was produced by ball milling vacuum dried $NH_4VO_3$ and thermally decomposing the ammonium vanadate under an argon stream. The disclosure of D. W. Murphy et al. is incorporated herein by reference in its entirety.

Vanadium oxides $V_3O_7$, $V_4O_9$, $V_6O_{13}$ and $V_6O_{13+x}$ [$0.16 \leq X \leq 0.5$] have been examined by Murphy et al., ibid., as cathode materials in ambient temperature non-aqueous secondary lithium cells. According to Murphy et al., the best cathode materials are $V_6O_{13}$ and a slightly oxygen-rich $V_6O_{13+x}$. Only the latter cathode materials consistently exhibited substantial capacities, good rechargability, and high charge potentials; and therefore made the best candidates for use as cathode active materials in non-aqueous lithium secondary batteries.

A related co-pending application describes the use and method of making $V_6O_{14+x}$ [$0<x \leq 1.0$], Ser. No. 08/184,087 entitled "A CATHODE ACTIVE MATERIAL $V_6O_{14+x}$ [$0<x \leq 1.0$], AND SOLID SECONDARY LITHIUM CELLS BASED THEREON" which is incorporated herein by reference in its entirety.

It would be advantageous if a method for making $V_6O_{13+x}$ [$0<X \leq 2.0$] could be found which provides control over the degree of non-stoichiometry in the product compound, i.e. controls the value of X. If this could be achieved it would be possible to find the cathode active material having the most improved cycle life and lithium capacity.

SUMMARY

The present invention improves the morphology of vanadium oxide having nominal stoichiometry close to $V_6O_{13}$ by producing $V_6O_{13+x}$ of particle size about 2 to 5 μm before grinding. It also improves the cycle life and lithium capacity of vanadium oxide cathodes while maintaining a crystalline structure similar to that of $V_6O_{13}$.

In the method of the present invention $V_6O_{13+x}$ [$0<X \leq 2.0$] is prepared from $V_6O_{13}$ in a stirred aqueous medium contained in a reaction vessel. $V_6O_{13}$ is slowly contacted with at least a nominal stoichiometric amount of hydrogen peroxide for the reaction:

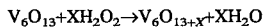

$$V_6O_{13} + XH_2O_2 \rightarrow V_6O_{13+X} + XH_2O$$

to form the product $V_6O_{13+X}$. The hydrogen peroxide is normally added slowly over a period of from about 4 to about 12 hours. In a preferred embodiment, a stream of oxygen is added to the stirred aqueous medium. Preferably, the reaction vessel and its contents are maintained at a temperature in the range of from about 10° C. to about 65° C. To produce a product $V_6O_{13+X}$ of higher oxygen content, the reaction vessel is sealed to maintain constant volume reaction conditions. The product is a micro-crystalline solid which is filtered, washed and dried before further use.

DETAILED DESCRIPTION OF THE PREFERRED EMBODIMENTS OF THE INVENTION

Prior to describing this invention in further detail, the following terms will first be defined.

Definitions

As used herein, the following terms have the following meanings.

The term "stoichiometric" or "stoichiometric compound" refers to a compound where the ratio of the number of atoms to each other, as determined from atomic weight, is a ratio of small, whole numbers. In "non-stoichiometric compounds" there are defects in the crystal lattice or partial replacement of the atoms of one element by those of another. The term "nominal stoichiometry" is used to refer to non-stoichiometric compounds where the ratio of the number of atoms to each other is not a ratio of small whole numbers.

The term "oxidation state" of an element in a compound refers to the difference between the number of electrons associated with an ion in the compound as compared with the number of electrons associated with the neutral atom of the element. In "oxidation" the oxidation state of an atom is increased. One way to perform oxidation is to increase the proportion of oxygen in the compound.

The term "hydrogen peroxide", $H_2O_2$, refers to a colorless, syrupy liquid prepared by several well known methods. Hydrogen peroxide is soluble in water and the aqueous concentration is often expressed as the volume of $O_2$ that can be liberated e.g. 100 vol. hydrogen peroxide is 30.36% (by vol.) $H_2O_2$ or 27.52% (by wt) $H_2O_2$.

The term "aqueous medium" as used herein refers to an aqueous solvent and an aqueous carrier of dispersed particles. Water, preferably distilled water, is the principal component of the aqueous medium, but it can contain minor amounts of oxygenated organic compounds. The pH of the aqueous medium is preferably in the range of from about 6 to about 8.

The term "electrochemical cell" or "electrolytic cell" refers to a composite structure containing a positive electrode, a negative electrode and a ion-conducting electrolyte interposed therebetween.

The term "capacity" or "discharge capacity" of the cell refers to the total amount of charge the fully charged battery can discharge to a certain final cell voltage. It is measured in ampere-hours. It is a measure of the useful charge in the battery. The initial capacity is that measured during the first full cycle of the cell. A comparison of the average cycle capacity to that of the initial cycle provides a measure of how well the cell maintains a constant capacity over repeated cycles.

The term "cycle" refers to a consecutive charge/discharge cycle. The ability of the cell or battery to maintain a useful capacity for many cycles indicates the useful life of the cell or battery.

The terms "solid, single-phase polymeric electrolyte" and "solid polymeric electrolyte" refer to an ionically conducting polymeric solid, normally comprising an inorganic salt, a compatible electrolyte solvent, and a solid polymeric matrix.

The term "solid polymeric matrix", as used herein, refers to a polymer made by polymerizing or copolymerizing monomer(s) or prepolymer(s) or oligomer(s). Certain solid polymeric matrices are useful in the preparation of solid polymeric electrolytes, are well known in the art, and are described, for example, in U.S. Pat. Nos. 4,908,283 and 4,925,751, both of which are incorporated herein by reference in their entirety.

The term, "a solid polymeric matrix forming monomer or polymer precursor" refers to inorganic or organic materials which in monomeric, oligomeric or polymeric form can be polymerized, or further polymerized, as by cross-linking, preferably in the presence of a salt and a solvent, to form solid polymeric matrices which are suitable for use in solid polymeric electrolytes in electrochemical cells. Typically, the solid polymeric matrix forming monomer or polymer precursor has at least one heteroatom capable of forming donor-acceptor bonds with inorganic cations, e.g. alkali ions.

The term "compatible electrolyte solvent", or in the context of components of the solid electrolyte, just "solvent", is a low molecular weight organic plasticizer added to the electrolyte and/or the cathode composition, which may also serve the purpose of solubilizing the inorganic ion salt. The solvent is any compatible, relatively non-volatile, aprotic, relatively polar, solvent. Preferably, these materials have boiling points greater than about 80° C. to simplify manufacture and increase the shelf life of the electrolyte/battery. Typical examples of solvent are mixtures of such materials as propylene carbonate, ethylene carbonate, gamma-butyrolactone, tetrahydrofuran, glyme, diglyme, triglyme, tetraglyme, dimethyl-sulfoxide, dioxolane, sulfolane, and the like. A particularly preferred solvent is disclosed in U.S. Pat. No. 5,262,253 which patent is incorporated herein by reference in its entirety.

The term "salt" refers to any salt, for example, an inorganic salt, which is suitable for use in a solid electrolyte. Representative examples of suitable inorganic ion salts are alkali metal salts of less mobile anions of weak bases having a large anionic radius. Examples of such anions are $I^-$, $Br^-$, $SCN^-$, $ClO^-_4$, $BF^-_4$, $PF^-_6$, $AsF^-_6$, $CF_3COO^-$, $CF_3SO^-_3$, and the like. Specific examples of suitable inorganic ion salts include $LiClO_4$, LiI LiSCN, $LiBF_4$, $LiAsF_6$, $LiCF_3SO_3$, $LiPF_6$, NaI, NaSCN, KI, and the like. The inorganic ion salt preferably contains at least one atom selected from the group consisting of Li, Na and K.

The term "electrochemical cell" refers to a composite structure containing an anode, a cathode, and an ion-conducting electrolyte interposed therebetween.

The "anode" refers to an electrode for the half-cell reaction of oxidation on discharge, which is typically comprised of a compatible anodic material, i.e. any material which functions as an anode in the solid electrochemical cell. Such compatible anodic materials are well known in the art and include, by way of example, lithium, lithium alloys, such as alloys of lithium with aluminum, mercury, iron, zinc and the like, and intercalation-based anodes such as carbon, tungsten oxide and the like.

The "cathode" refers to the counter-electrode to the anode and is typically composed of a compatible cathodic material (i.e. insertion compounds) which is any material which functions as a cathode in an electrochemical cell. Such compatible cathodic materials are well known to the art and include by way of example, manganese oxides, molybdenum oxides, vanadium oxides, such as $V_6O_{13}$, sulfides of molybdenum, titanium and niobium, lithiated cobalt oxides, lithiated magnaese oxides, lithiated nickel oxides, chromium oxides, copper oxides, and the like. The particular compatible cathodic material employed is not critical

METHOD $V_6O_{13}$ has been prepared the reaction of stoichiometric amounts of $V_2O_5$ and vanadium metal powder intimately mixed and heated to 600° C. in an evacuated quartz tube. After one day, the temperature was increased to 680° C. for 1–3 days. The resulting micro-crystalline product was deep purple in color and exhibited a metallic luster (see Murphy et al. ibid).

$V_6O_{13}$ and vanadium oxides with nominal compositions close to $V_6O_{13}$ have been prepared by the thermal decomposition of ammonium vanadate ($NH_4\ VO_3$) at a controlled rate in an inert atmosphere (such as argon or nitrogen) or in a reducing atmosphere (such as $H_2$, $NH_3$ or $SO_2$) at a temperature of approximately 450° C. (see U.S. Pat. No.

4,228,226). The preparation and analysis of $V_6O_{13}$ powders has also been described by K. West et al., Electrochim. Acta, 28 (1983) 1829, the disclosure of which is incorporated herein by reference in its entirety. The $V_6O_{13}$ used in the examples was obtained from CERAC, Inc., Milwaukee, Wis.

Prior to dispersion of the $V_6O_{13}$ in an aqueous medium, the $V_6O_{13}$ solid is preferably ground to a fine powder. The powder is dispersed in the reaction vessel containing the aqueous medium by a rapid stirring means. An aqueous solution of $H_2O_2$ is then added very slowly to the stirred $V_6O_{13}$ which is preferably maintained at a temperature near room temperature. The temperature of the reaction vessel can range from about 10° C. to about 45° C. The concentration of added aqueous $H_2O_2$ is in the range of from about 10% (by vol) to 80% (by vol), preferably from 20% to 60% and most preferably about 30%.

A stream of oxygen gas can also be added to the stirred aqueous reaction mixture during the course of the reaction, i.e. during the 4–12 hours it requires to slowly add a nominally stoichiometric amount of $H_2O_2$. To produce a product $V_6O_{13+x}$ of higher oxygen content, the reaction vessel may be sealed to maintain constant volume reaction conditions.

The product of the reaction is a micro-crystalline solid which is filtered from the aqueous medium, washed with distilled water, and dried in a air-blown oven at about 60° C. The micro-crystalline mass may be crushed and the balance of the water removed by drying the crushed mass in vacuo.

Analysis is made gravimetrically by weighing the product as the pentoxide. Specifically, TGA (600° C.) is used in the reaction $V_6O_{13+X} + (1\ 1/2\ X)\ O_2 \rightarrow 3V_2O_5$, to determine X by weight increase. X was also determined by potentiometric titration with $KM_nO_4$. The reaction methods of the present invention have been found to provide several means of controlling the non-stoichiometric parameter X in the product $V_6O_{13+X}$. Such means include the rate of addition of $H_2O_2$, the concentration of $H_2O_2$, the addition of $O_2$, the temperature, and the use of a constant volume reaction. In general, to increase the value of X a slower rate of addition of more concentrated $H_2O_2$ is used, $O_2$ is added, the temperature is maintained near room temperature, and a constant volume reaction is used. One or more of these means can be used simultaneously to achieve the stated objective.

EXAMPLE 1

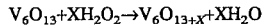

10 grams of $V_6O_{13}$ were dispersed in 10 ml of distilled water for about 10 minutes. 2 ml of $H_2O_2$ (30%, by vol, aqueous solution) was slowly added to the cooled mixture of $V_6O_{13}$ in $H_2O$ at a rate of about one drop every ten seconds, while the mixture was continually stirred. After addition of the $H_2O_2$ was completed, the mixture was stirred for from 4–6 hours. The mixture was dried in an airblown oven at 60° C. to make it easier to crush the powder and to remove the balance of the water. The powder was dried in vacuo at a conveniently higher temperature of about 150° C.

EXAMPLE 2

As described in Example 1, nominal stoichiometric amounts of $V_6O_{13}$ and $H_2O_2$ (X=1) were mixed in water with a stream of oxygen applied at the rate of 25 cc/min for 12 hours. It was found that very close control can be obtained over the value of the non-stoichiometric parameter X. In this way, $V_6O_{13.8}$ and $V_6O_{14.2}$ were synthesized. The resulting material was filtered and washed with water, predried at 65° C., and then dried under vacuum at 150° C.

Utility

The vanadium oxide cathode mixtures described herein are useful in preparing electrochemical cells having improved cumulative capacity and cycle life in comparison to electrochemical cells containing conventional vanadium oxide cathode formulations. Moreover, the subject vanadium oxide cathode mixtures should be particularly useful in preparing solid electrolyte cells having improved cumulative capacity and cycle life in comparison to solid electrolyte cells comprising conventional vanadium oxide cathode compositions.

EXAMPLES

The following hypothetical examples are offered to illustrate the present invention and should not be construed in any way as limiting its scope.

A solid electrolytic cell is prepared by first preparing a cathodic paste which is spread onto a current collector and is then cured to provide for the cathode. An electrolyte solution is then placed onto the cathode surface and is cured to provide for the solid electrolyte composition. Then, the anode is laminated onto the solid electrolyte composition to provide for a solid electrolytic cell. The specifics of this construction are as follows:

A. The Current Collector

The current collector employed is a sheet of aluminum foil having a layer of adhesion promoter attached to the surface of the foil which will contact the cathode so as to form a composite having a sheet of aluminum foil, a cathode and a layer of adhesion promoter interposed therebetween.

Specifically, the adhesion promoter layer is prepared as a dispersed colloidal solution in one of two methods. The first preparation of this colloidal solution for this example is as follows:

84.4 weight percent of carbon powder (Shawinigan Black™—available from Chevron Chemical Company, San Ramon, Calif.)

337.6 weight percent of a 25 weight percent solution of polyacrylic acid (a reported average molecular weight of about 90,000, commercially available from Aldrich Chemical Company—contains about 84.4 grams polyacrylic acid and 253.2 grams water)

578.0 weight percent of isopropanol

The carbon powder and isopropanol are combined with mixing in a conventional high shear colloid mill mixer (Ebenbach-type colloid mill) until the carbon is uniformly dispersed and the carbon particle size is smaller than 10 microns. At this point, the 25 weight percent solution of polyacrylic acid is added to the solution and mixed for approximately 15 minutes. The resulting mixture is pumped to the coating head and roll coated with a Meyer rod onto a sheet of aluminum foil (about 9 inches wide and about 0.0005 inches thick). After application, the solution/foil are contacted with a Mylar wipe (about 0.002 inches thick by about 2 inches and by about 9 inches wide—the entire width of aluminum foil). The wipe is flexibly engaged with the foil (i.e., the wipe merely contacted the foil) to redistribute the solution so as to provide for a substantially uniform coating. Evaporation of the solvents (i.e., water and isopropanol) via a conventional gas-fired oven provides for an electrically-conducting adhesion-promoter layer of about 6 microns in thickness or about $3\times10^{-4}$ grams per $cm^2$. The aluminum foil is then cut to about 8 inches wide by removing approximately ½ inch from either side by the use of a conventional slitter so as to remove any uneven edges.

In order to further remove the protic solvent from this layer, the foil is redried. In particular, the foil is wound up and a copper support placed through the roll's cavity. The roll is then hung overnight from the support in a vacuum oven maintained at about 130° C. Afterwards, the roll is removed. In order to avoid absorption of moisture from the atmosphere, the roll is preferably stored into a desiccator or other similar anhydrous environment to minimize atmospheric moisture content until the cathode paste is ready for application onto this roll.

The second preparation of this colloidal solution comprises mixing 25 lbs of carbon powder (Shawinigan Black™—available from Chevron Chemical Company, San Ramon, Calif.) with 100 lbs of a 25 weight percent solution of polyacrylic acid (average molecular weight of about 240,000, commercially available frown BF Goodrich, Cleveland, Ohio, as Good-Rite K702—contains about 25 lbs polyacrylic acid and 75 lbs water) and with 18.5 lbs of isopropanol. Stirring is done in a 30 gallon polyethylene drum with a gear-motor mixer (e.g., Lightin Labmaster Mixer, model XJ-43, available from Cole-Parmer Instruments Co., Niles, Ill.) at 720 rpm with two 5 inch diameter A310-type propellers mounted on a single shaft. This wets down the carbon and eliminates any further dust problem. The resulting weight of the mixture is 143.5 lbs and contains some "lumps".

The mixture is then further mixed with an ink mill which consists of three steel rollers almost in contact with each other, turning at 275, 300, and 325 rpms respectively. This high shear operation allows particles that are sufficiently small to pass directly through the rollers. Those that do not pass through the rollers continue to mix in the ink mill until they are small enough to pass through these rollers. When the mixing is complete, the carbon powder is completely dispersed. A Hegman fineness of grind gauge (available from Paul N. Gardner Co., Pompano Beach, Fla.) indicates that the particles are 4–6 µm with the occasional 12.5 µm particles. The mixture can be stored for well over 1 month without the carbon settling out or reagglomerating.

When this composition is to be used to coat the current collector, an additional 55.5 lbs of isopropanol is mixed into the composition working with 5 gallon batches in a plastic pail using an air powered shaft mixer (Dayton model 42231 available from Grainger Supply Co., San Jose, Calif.) with a 4 inch diameter Jiffy-Mixer brand impeller (such as an impeller available as Catalog No. G-04541-20 from Cole Parmer Instrument Co., Niles, Ill.). Then, it is gear pumped through a 25 µm cloth filter (e.g., So-Clean Filter Systems, American Felt and Filter Company, Newburgh, N.Y.) and Meyer-rod coated as described above.

The cathode is prepared from a cathodic paste which, in turn, is prepared from a cathode powder as follows:

i. Cathode Powder

The cathode powder is prepared by combining 90.44 weight percent $V_6O_{13+x}$ [prepared by the method of the present invention] and 9.56 weight percent of carbon (from Chevron Chemical Company, San Ramon, Calif. under the tradename of Shawinigan Black™). About 100 grams of the resulting mixture is placed into a grinding machine (Attritor Model S-1 purchased from Union Process, Akron, Ohio) and ground for 30 minutes. Afterwards, the resulting mixture is dried at about 260° C. for 21 hours.

ii. Cathode Paste

A cathode paste is prepared by combining sufficient cathode powder to provide for a final product having 45 weight percent $V_6O_{13+x}$.

Specifically, 171.6 grams of a 4:1 weight ratio of propylene carbonate:triglyme is combined with 42.9 grams of polyethylene glycol diacrylate (molecular weight about 400 available as SR-344 from Sartomer Company, Inc., Exton, Pa.), and about 7.6 grams of ethoxylated trimethylolpropane triacylate (TMPEOTA) (molecular weight about 450 available as SR-454 from Sartomer Company, Inc., Exton, Pa.) in a double planetary mixer (Ross #2 mixer available from Charles Ross & Sons, Company, Hauppag, N.Y.).

A propeller mixture is inserted into the double planetary mixer and the resulting mixture is stirred at a 150 rpms until homogeneous. The resulting solution is then passed through sodiated 4A molecular sieves. The solution is then returned to double planetary mixer equipped with the propeller mixer and about 5 grams of polyethylene oxide (number average molecular weight about 600,000 available as Polyox WSR-205 from Union Carbide Chemicals and Plastics, Danbury, Conn.) is added to the solution vortex from by the propeller by a mini-sieve such as a 25 mesh mini-sieve commercially available as Order No. 57333-965 from VWR Scientific, San Francisco, Calif.

The solution is then heated while stirring until the temperature of the solution reaches 65° C. At this point, stirring is continued until the solution is completely clear. The propeller blade is removed and the carbon powder prepared as above is then is added as well as an additional 28.71 grams of unground carbon (from Chevron Chemical Company, San Ramon, Calif. under the tradename of Shawinigan Black™). The resulting mixture is mixed at a rate of 7.5 cycles per second for 30 minutes in the double planetary mixer. During this mixing the temperature is slowly increased to a maximum of 73° C. At this point, the mixing is reduced to 1 cycle per second the mixture slowly cooled to 40° C. to 48° C. (e.g. about 45° C.). The resulting cathode paste is maintained at this temperature until just prior to application onto the current collector.

The resulting cathode paste has the following approximate weight percent of components:

| | |
|---|---|
| $V_6O_{13+x}$ | 45 weight percent |
| Carbon | 10 weight percent |
| 4:1 propylene carbonate/triglyme | 33.5 weight percent |
| polyethylene oxide | 1 weight percent |
| polyethylene glycol diacrylate | 8.5 weight percent |
| ethoxylated trimethylolpropane triacrylate | 1.5 weight percent |
| fluorad FC-430 | 0.5 weight percent |

In an alternative embodiment, the requisite amounts of all of the solid components are added to directly to combined liquid components. In this regard, mixing speeds can be adjusted to account for the amount of the material mixed and size of vessel used to prepare the cathode paste. Such adjustments are well known to the skilled artisan.

In order to enhance the coatability of the carbon paste onto the current collector, it may be desirable to heat the paste to a temperature of from about 60° C. to about 130° C. and more preferably, from about 80° C. to about 90° C. and for a period of time of from about 0.1 to about 2 hours, more preferably, from about 0.1 to 1 hour and even more preferably from about 0.2 to 1 hour. A particularly preferred combination is to heat the paste at from about 80° C. to about 90° C. for about 0.33 to about 0.5 hours.

During this heating step, there is no need to stir or mix the paste although such stirring or mixing may be conducted during this step. However, the only requirement is that the composition be heated during this period. In this regard, the composition to be heated has a volume to surface area ratio such that the entire mass is heated during the heating step.

The so-prepared cathode paste is then placed onto the adhesion layer of the current collector described above by extrusion at a temperature of from about 45° to about 48° C. A Mylar cover sheet is then placed over the paste and the paste is spread to thickness of about 90 microns (μm) with a conventional plate and roller system and is cured by continuously passing the sheet through an electron beam apparatus (Electro-curtain, Energy Science Inc., Woburn, Mass.) at a voltage of about 175 Kv and a current of about 1.0 Ma and at a rate of about 1 cm/sec. After curing, the Mylar sheet is removed to provide for a solid cathode laminated to the aluminum current collector described above.

C. Electrolyte 56.51 grams of propylene carbonate, 14.13 grams of triglyme, and 17.56 grams of urethane acrylate (Photomer 6140, available from Henkel Corp., Coating and Chemical Division, Ambler, Pa.) are combined at room temperature until homogeneous.

At this point, 2.57 grams of polyethylene oxide film forming agent having a number average molecular weight of about 600,000 (available as Polyox WSR-205 from Union Carbide Chemicals and Plastics, Danbury, Conn.) is added to the solution and then dispersed while stirring with a magnetic stirrer over a period of about 120 minutes. After dispersion, the solution is heated to between 60° C. and 65° C. with stirring until the film forming agent dissolved. The solution is cooled to a temperature of between 45° and 48° C., a thermocouple is placed at the edge of the vortex created by the magnetic stirrer to monitor solution temperature, and then 9.24 grams of $LiPF_6$ is added to the solution over a 120 minute period while thoroughly mixing to ensure a substantially uniform temperature profile throughout the solution. Cooling is applied as necessary to maintain the temperature of the solution between 45° and 48° C.

In one embodiment, the polyethylene oxide film forming agent is added to the solution via a mini-sieve such as a 25 mesh mini-sieve commercially available as Order No. 57333-965 from VWR Scientific, San Francisco, Calif.

The resulting solution contains the following:

| Component | Amount | Weight Percent[a] |
|---|---|---|
| Propylene Carbonate | 56.51 g | 56.51 |
| Triglyme | 14.13 g | 14.13 |
| Urethane Acrylate | 17.56 g | 17.56 |
| $LiPF_6$ | 9.24 g | 9.24 |
| PEO Film Forming Agent | 2.57 g | 2.57 |
| Total | 100 g | 100 |

[a] = weight percent based on the total weight of the electrolyte solution (100 g)

This solution is then degassed to provide for an electrolyte solution wherein little, if any, of the $LiPF_6$ salt decomposes.

Optionally, solutions produced as above and which contain the prepolymer, the polyalkylene oxide film forming agent, the electrolyte solvent and the $LiPF_6$ salt are filtered to remove any solid particles or gels remaining in the solution. One suitable filter device is a sintered stainless steel screen having a pore size between 1 and 50 μm at 100% efficiency.

Alternatively, the electrolyte solution can be prepared in the following manner. Specifically, in this example, the mixing procedure is conducted using the following weight percent of components:

| Propylene Carbonate | 52.472 weight percent |
|---|---|
| Triglyme | 13.099 weight percent |
| Urethane Acrylate[b] | 20.379 weight percent |
| $LiPF_6$ | 10.720 weight percent |
| PEO Film Forming Agent[c] | 3.340 weight percent |

[b](Photomer 6140, available from Henkel Corp., Coating and Chemical Division, Ambler, PA)
[c]polyethylene oxide film forming agent having a number average molecular weight of about 600,000 (available as Polyox WSR-205 from Union Carbide Chemicals and Plastics, Danbury, CT)

The mixing procedure employs the following steps:

1. Check the moisture level of the urethane acrylate. If the moisture level is less than 100 ppm water, proceed to step 2. If not, then first dissolve the urethane acrylate at room temperature, <30° C., in the propylene carbonate and triglyme and dry the solution over sodiated 4A molecular sieves (Grade 514, 8–12 Mesh from Schools Inc., Moraga, Calif.) and then proceed to step 4.

2. At room temperature, <30° C., add the urethane acrylate to the solvent prepared in step 2. Stir at 300 rpm until the resin is completely dissolved. The solution should be clear and colorless.

3. Dry and then sift the polyethylene oxide film forming agent through a 25 mesh mini-sieve commercially available as Order No. 57333-965 from VWR Scientific, San Francisco, Calif. While stirring at 300 rpm, add the dried and pre-sifted polyethylene oxide film forming agent slowing to the solution. The polyethylene oxide film forming agent should be sifted into the center of the vortex formed by the stirring means over a 30 minute period. Addition of the polyethylene oxide film forming agent should be dispersive and, during addition, the temperature should be maintained at room temperature (<30° C.).

4. After final addition of the polyethylene oxide film forming agent, stir an additional 30 minutes to ensure that the film forming agent is substantially dispersed.

5. Heat the mixture to 68° C. to 75° C. and stir until the film forming agent has melted and the solution has become transparent to light yellow in color. Optionally, in this step, the mixture is heated to 65° C. to 68° C.

6. Cool the solution produced in step 6 and when the temperature of the solution reaches 40° C., add the $LiPF_6$ salt very slowly making sure that the maximum temperature does not exceed 55° C.

7. After the final addition of the $LiPF_6$ salt, stir for an additional 30 minutes, degas, and let sit overnight and cool.

8. Filter the solution through a sintered stainless steel screen having a pore size between 1 and 50 μm at 100% efficiency.

At all times, the temperature of the solution should be monitored with a thermocouple which should be placed in the vortex formed by the mixer.

Afterwards, the electrolyte mixture is then coated by a conventional knife blade to a thickness of about 50 μm onto the surface of the cathode sheet prepared as above (on the side opposite that of the current collector) but without the Mylar covering. The electrolyte is then cured by continuously passing the sheet through an electron beam apparatus (Electrocurtain, Energy Science Inc., Woburn, Mass.) at a voltage of about 175 Kv and a current of about 1.0 Ma and at a conveyor speed setting of 50 which provides for a conveyor speed of about 1 cm/sec. After curing, a composite is recovered which contained a solid electrolyte laminated to a solid cathode.

D. Anode

The anode comprises a sheet of lithium foil (about 50 μm thick) which is commercially available from FMC Corporation Lithium Division, Bessemer City, N.C.

E. The Solid Electrolytic Cell

A sheet comprising a solid battery is prepared by laminating the lithium foil anode to the surface of the electrolyte in the sheet produced in step C above. Lamination is accomplished by minimal pressure.

While the invention has been described in terms of various preferred embodiments, the skilled artisan will appreciated the various modifications, substitutions, omissions and changes which may be made without departing from the spirit thereof. The descriptions of subject matter in this disclosure are illustrative of the invention and are not intended to be construed as limitation upon the scope of the invention.

What is claimed:

1. A method of making $V_6O_{13+x}$ wherein $0<x<2.0$ comprising the steps of: in a stirred aqueous medium contained in a reaction vessel, slowly contacting $V_6O_{13}$ with at least a nominal stoichiometric amount of hydrogen peroxide to form the product $V_6O_{13+x}$ wherein $0<x<2.0$; and drying said product.

2. The method of claim 1 wherein an aqueous solution of $H_2O_2$ is added slowly to said stirred aqueous medium containing $V_6O_{13}$ over a period of about 4 to about 12 hours.

3. The method of claim 2 further comprising the step of applying a stream of oxygen to said stirred aqueous medium.

4. The method of claim 3 wherein the product produced is $V_6O_{13.8}$.

5. The method of claim 3 wherein the product produced is $V_6O_{14.2}$.

6. The method of claim 1 wherein a stream of oxygen is added to said stirred aqueous medium.

7. The method of claim 1 wherein said reaction vessel is maintained at temperature of about 0° C. to about 45° C.

8. The method of claim 1 wherein said reaction vessel is sealed to maintain a constant volume reaction.

* * * * *